United States Patent Office 3,703,500
Patented Nov. 21, 1972

3,703,500
VULCANIZATION RETARDERS OF TRIHALO-
SULPHENYL-SULPHONAMIDES
Roland Nast, Dormagen, Engelbert Kühle, Bergisch Gladbach, and Manfred Abele, Porz, Germany, assignors to Farbenfabriken Bayer Aktiengessellschaft, Leverkusen, Germany
No Drawing. Filed Oct. 20, 1970, Ser. No. 82,493
Claims priority, application Germany, Nov. 15, 1969, P 19 57 484.6
Int. Cl. C08f 27/06; C08c 11/54
U.S. Cl. 260—79.5 B        11 Claims

ABSTRACT OF THE DISCLOSURE
Compounds of the formula

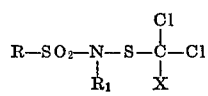

in which

R represents an alkyl radical optionally substituted by chlorine, a cycloalkyl radical, an aryl radical optionally substituted by at least one alkyl group and/or chlorine atom, an aralkyl radical or a dialkylamino group, $R_1$ represents an aryl radical optionally substituted by at least one alkyl group and/or chlorine atom, and X represents chlorine or fluorine are used as vulcanization retarders in natural and/or synthetic rubber mixtures. One of these vulcanization retarders of the aforementioned general formula is N-phenyl - N - (trichloromethylsulphenyl) - methylsulphonamide.

---

The present invention relates to the use of substituted sulphonamides as vulcanization retarders for the production and application of mixtures based on natural or synthetic rubber.

In the production and application of rubber mixtures which contain vulcanization agents such as sulphur and accelerators, a certain amount of unwanted premature vulcanization, known as scorching, may occur before the actual vulcanization (see Bayer-Mitteilungen für die Gummi-Industrie No. 42 of Jan. 5, 1968, pages 3–7, especially page 3, lefthand column). This scorching may occur, for example, in the mixer or during any of the subsequent application processes such as spraying or calendering.

It is already known that the risk of scorching can be reduced by the addition of N-nitroso-amines such as N-nitroso-diphenylamine to rubber mixtures (see Technical information R 22 "Rubber Chemicals" of Imperial Chemical Industries, Manchester, England, pages 1–11, especially page 1; Rubber Chemistry and Technology, volume 30 (1957), pages 1291–1346, especially page 1302, lines 3 and 4; and Rubber Journal, March 1967, page 11, righthand column, paragraph 2, especially line 18 in the righthand column).

Under certain conditions, however, the use of these retarders results in the formation of porous vulcanizates due to the nitroso group being split off (see Technical Information R 22 "Rubber Chemicals" of Imperial Chemical Industries, Manchester, England, pages 1–11, especially page 2, second paragraph). Furthermore, these compounds not only have an effect on the scorching but also substantially increase the time required to complete the vulcanization process (see Bayer Mitteilungen für die Gummi-Industrie, No. 42 of Jan. 5, 1068, pages 3–7, especially page 3, righthand column, lines 39–45 and page 3, righthand column, last paragraph, especially lines 47, 48, 55 and 56).

Moreover, a relatively large amount of the N-nitrosoamine is required to achieve a given retarding effect.

It has now been found that substituted trihalomethylsulphenyl-sulphonamides of the general formula:

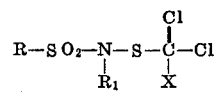

(I)

in which

R represents an alkyl radical optionally substituted by chlorine, a cycloalkyl radical, an aryl radical optionally substituted by at least one alkyl group and/or chlorine atom, an aralkyl radical or a dialkylamino group, $R_1$ represents an aryl radical optionally substituted by at least one alkyl group and/or chlorine atom, and X represents chlorine or fluorine are suitable for use as vulcanization retarders in the conventional methods of producing and applying mixtures containing natural or synthetic rubber.

The trihalomethyl-sulphenyl-sulphonamides according to the invention surprisingly show a considerably more powerful effect as vulcanization retarders than the N-nitrosoamines known in the art. In addition, they do not give rise to porous vulcanizates and if used in suitable quantities they have less influence on the time required to complete vulcanization than N-nitroso-amines.

The following are examples of radicals R in the Formula I: Unbranched or branched alkyl groups with from 1 to 6 carbon atoms and optionally substituted by chlorine, such as methyl, ethyl, n-propyl, isopropyl, n-butyl, tertiary-butyl, n-pentyl, n-hexyl, chloromethyl, chloroethyl, 1-chloro-n-propyl, 2-chloro-n-propyl, 1-chloro-isopropyl or 2-chloro-isopropyl; cycloalkyl groups such as cyclopentyl, cyclohexyl or methyl cyclohexyl; aralkyl groups such as benzyl, phenylethyl, phenylpropyl or phenylisopropyl.

The following are examples of aryl radicals R optionally substituted by alkyl groups: Phenyl, α-naphthyl, β-naphthyl, methylphenyl, ethylphenyl, n-propylphenyl, isopropylphenyl, n-butylphenyl or tertiary-butylphenyl, the alkyl groups in all these cases being either in the ortho, the meta or para-position of the phenyl radical; furthermore:

2,3-dimethylphenyl,
2,4-dimethylphenyl, 2,5-dimethylphenyl,
2,6-dimethylphenyl,
3,5-dimethylphenyl,
3,4-dimethylphenyl,
2,3-diethylphenyl,
2,4-diethylphenyl,
2,5-diethylphenyl,
2,6-diethylphenyl,
3,4-diethylphenyl,
3,5-diethylphenyl,
2-methyl-3-ethylphenyl,
2-methyl-4-ethylphenyl,
2-methyl-5-ethylphenyl,
2-methyl-6-ethylphenyl,
3-methyl-2-ethylphenyl,
3-methyl-4-ethylphenyl,
3-methyl-5-ethylphenyl,
4-methyl-2-ethylphenyl,
4-methyl-3-ethylphenyl,
5-methyl-2-ethylphenyl,
2,3,4-trimethylphenyl,
2,3,5-trimethylphenyl,
2,3,6-trimethylphenyl,
2,3,5-trimethylphenyl,
2,4,6-trimethylphenyl,
3,4,5-trimethylphenyl,
2,3-dimethyl-4-ethylphenyl,
2,3-dimethyl-5-ethylphenyl,
2,3-dimethyl-6-ethylphenyl,
2,4-dimethyl-3-ethylphenyl,
2,4-dimethyl-5-ethylphenyl,
2,4-dimethyl-6-ethylphenyl,
2,5-dimethyl-3-ethylphenyl,
2,5-dimethyl-4-ethylphenyl,
2,5-dimethyl-6-ethylphenyl,
2,6-dimethyl-3-ethylphenyl,
2,6-dimethyl-4-ethylphenyl,
3,4-dimethyl-2-ethylphenyl,
3,4-dimethyl-5-ethylphenyl,
3,4-dimethyl-6-ethylphenyl,
3,5-dimethyl-4-ethylphenyl,
3,5-dimethyl-6-ethylphenyl,
4-methyl-2,3-diethylphenyl,
5-methyl-2,3-diethylphenyl,
6-methyl-2,3-diethylphenyl,
3-methyl-2,4-diethylphenyl,
5-methyl-2,4-diethylphenyl,
6-methyl-2,4-diethylphenyl,
3-methyl-2,5-diethylphenyl,
4-methyl-2,5-diethylphenyl,
6-methyl-2,5-diethylphenyl,
3-methyl-2,6-diethylphenyl,
4-methyl-2,6-diethylphenyl,
2-methyl-3,4-diethylphenyl,
5-methyl-3,4-diethylphenyl,
6-methyl-3,4-diethylphenyl,
4-methyl-3,5-diethylphenyl,
6-methyl-3,5-diethylphenyl,
2,3,4-triethylphenyl,
2,3,5-triethylphenyl,
2,3,6-triethylphenyl,
2,4,5-triethylphenyl,
2,4,6-triethylphenyl, or
3,4,5-triethylphenyl.

The following are mentioned as examples of aryl radicals R optionally substituted by at least one chlorine atom:

4-chlorophenyl,
2-chlorophenyl,
2,4-dichlorophenyl,
3,4-dichlorophenyl,
2,4,6-trichlorophenyl,
3-chlorophenyl,
2-methyl-4-chlorophenyl,
4-methyl-2-chlorophenyl,
4-methyl-3-chlorophenyl,
2-ethyl-4-chlorophenyl,
4-ethyl-2-chlorophenyl,
2-methyl-4,6-dichlorophenyl,
2,4-dimethyl-6-chlorophenyl,
4-methyl-2,6-dichlorophenyl,
2,6-dimethyl-4-chlorophenyl,
2,5-dimethyl-4-chlorophenyl,
2,5-dimethyl-3-chlorophenyl,
2,4-diethyl-6-chlorophenyl,
2,6-diethyl-4-chlorophenyl,
2,5-diethyl-4-chlorophenyl,
2,5-diethyl-3-chlorophenyl,
2-methyl-4-ethyl-6-chlorophenyl,
4-methyl-2-ethyl-6-chlorophenyl,
2-methyl-5-ethyl-4-chlorophenyl.

The following are suitable as dialkylamino groups R:

dimethylamino,
diethylamino,
di-n-propylamino,
diisopropyl-amino,
di-n-butylamino,
di-tertiary-butylamino,
methylethylamino,
methyl-n-propylamino,
methylisopropylamino,
methyl-n-butylamino,
methyl-tertiary-butylamino,
ethyl-n-propylamino,
ethyl-isopropylamino,
ethyl-n-butylamino,
ethyl-tertiary-butylamino,
n-propyl-n-butylamino,
n-propyl-tertiary-butylamino,
isopropyl-n-butylamino, and the isopropyl-tertiary-butylamino group.

Suitable aryl radicals $R_1$ optionally substituted by alkyl groups and/or chlorine atoms are the groups already mentioned for the radical R.

The following are mentioned as individual examples of compounds which may be used for the invention:

N-phenyl-N-(trichloromethylsulphenyl)-benzenesulphonamide,
N-o-tolyl-N-(trichloromethylsulphenyl)-benzenesulphonamide,
N-p-tolyl-N-(trichloromethylsulphenyl)-benzenesulphonamide,
N-m-tolyl-N-(trichloromethylsulphenyl)-benzenesulphonamide,
N-phenyl-N-(trichloromethylsulphenyl)-methylsulphonamide,
N-phenyl-N-(trichloromethylsulphenyl)-chloromethylsulphonamide,
N-phenyl-N-(trichloromethylsulphenyl)-N,N'-dimethylsulphamide,
N-phenyl-N-(trichloromethylsulphenyl)-cyclohexylsulphonamide,
N-phenyl-N-(trichloromethylsulphenyl)-p-toluenesulphonamide,
N-phenyl-N-(fluorodichloromethylsulphenyl)-N',N'-dimethylsulphamide,
N-phenyl-N-(fluorodichloromethylsulphenyl)-benzenesulphonamide,
N-phenyl-N-(fluorodichloromethylsulphenyl)-methylsulphonamide,
N-phenyl-N-(trichloromethylsulphenyl)-ethylsulphonamide
N-phenyl-N-(trichloromethylsulphenyl)-n-propylsulphonamide,
N-phenyl-N-(trichloromethylsulphenyl)-isopropylsulphonamide,
N-phenyl-N-(fluorodichloromethylsulphenyl)-ethylsulphonamide, N-phenyl-N1(fluorodichloromethylsulphenyl)-n-propylsulphonamide.
N-phenyl-N-(fluorodichloromethylsulphenyl)-isopropylsulphonamide,
N-phenyl-N-(trichloromethylsulphenyl)-n-butylsulphonamide,
N-phenyl-N-(trichloromethylsulphenyl)-tertiary-butylsulphonamide,
N-phenyl-N-(fluorodichloromethylsulphenyl)n-butylsulphonamide,
N-phenyl-N-(fluorodichloromethylphenyl)-tertiary-butylsulphonamide,
N-phenyl-N-(trichloromethylsulphenyl)-N,N'-diethylsulphamide,
N-phenyl-N-(trichloromethylsulphenyl)-N',N'-di-n-propylsulphamide,
N-phenyl-N-(trichloromethylsulphenyl)-N,N'-diisopropylsulphamide,
N-phenyl-N-(fluorodichloromethylsulphenyl)-N',N'-diethylsulphamide,
N-phenyl-N-(fluorodichloromethylsulphenyl)-N',N'-di-n-propylsulphamide,
N-phenyl-N-N-(fluorodichloromethylsulphenyl)-N',N'-diisopropylsulphamide,
N-o-tolyl-N-(fluorodichloromethylsulphenyl)benzenesulphonamide,
N-p-tolyl-N-(fluorodichloromethylsulphenyl)-benzenesulphonamide,
N-o-tolyl-N-(fluorodichloromethylsulphenyl)-methylsulphonamide,
N-p-tolyl-N-(fluorodichloromethylsulphenyl)-methylsulphonamide,
N-o-tolyl-N-(trichloromethylsulphenyl)-methylsulphonamide,
N-p-tolyl-N-(trichloromethylsulphenyl)-methylsulphonamide,
N-phenyl-N-(fluorodichloromethylsulphenyl)-o-toluenesulphonamide,
N-phenyl-N-(fluorodichloromethylsulphenyl)-cyclohexylsulphonamide,
N-o-tolyl-N-(fluorodichloromethylsulphenyl)-cyclohexylsulphonamide,
N-p-tolyl-N-(fluorodichloromethylsulphenyl)-cyclohexylsulphonamide,
N-phenyl-N-(fluorodichloromethylsulphenyl)-methylcyclohexyl sulphonamide,
N-o-tolyl-N-(fluorodichloromethylsulphenyl)-methylcyclohexyl sulphonamide,
N-p-tolyl-N-(fluorodichloromethylsulphenyl)-methylcyclohexyl sulphonamide,
N-o-tolyl-N-(fluorodichloromethylsulphenyl)-methylcyclohexyl sulphonamide,
N-p-tolyl-N-(fluorodichloromethylsulphenyl)-methylcyclohexyl sulphonamide,
N-phenyl-N-(trichloromethylsulphenyl)-methylcyclohexylsulphonamide,
N-phenyl-N-(trichloromethylsulphenyl)-chloroethylsulphonamide,
N-phenyl-N-(fluorodichloromethylsulphenyl)-chloroethylsulphonamide,
N-o-tolyl-N-(fluorodichloromethylsulphenyl)-chloroethylsulphamide,
N-p-tolyl-N-(fluorodichloromethylsulphenyl)-chloroethylsulphamide,
N-o-tolyl-N-(trichloromethylsulphenyl)-chloroethylsulphonamide,
N-p-tolyl-N-(trichloromethylmethylsulphenyl)-chloroethylsulphonamide,
N-o-tolyl-N-(trichloromethylsulphenyl)-N',N'-dimethylsulphonamide,
N-p-tolyl-N-(trichloromethylsulphenyl)-N',N'-dimethylsulphonamide,
N-o-tolyl-N-(trichloromethylsulphenyl)-N',N'-diethylsulphamide
N-p-tolyl-N-(trichloromethylsulphenyl)-N',N'-diethylsulphamide,
N-o-tolyl-N-(fluorodichloromethylsulphenyl)-N',N'-dimethylphamide
N-p-tolyl-N-(fluorodichlormethylsulphenyl)-N',N'-dimethylsulphamide,
N-o-tolyl-N-(fluorodichloromethylsulphenyl)-N',N'-diethylsulphamide,
N-p-tolyl-N-(fluorodichloromethylsulphenyl)-N',N'-diethylsulphamide,
N-o-tolyl-N-(fluorodichloromethylsulphenyl)-ethylsulphonamide,
N-p-tolyl-N-(fluorodichloromethylsulphenyl)-ethylsulphonamide,
N-o-tolyl-N-(trichloromethylsulphenyl)-ethylsulphonamide,
N-p-tolyl-N-(trichloromethylsulphenyl)-ethylsulphonamide,
N-phenyl-N-(trichloromethylsulphenyl)-o-toluenesulphonamide,
N-o-tolyl-N-(fluorodichloromethylsulphenyl)-o-toluenesulphonamide,
N-p-tolyl-N-(fluorodichloromethylsulphenyl)-p-toluenesulphonamide, and
N-phenyl-N-(trichloromethylsulphenyl)-methylcyclohexylsulphonamide.

Suitable rubbers for the production and application of mixtures based on natural or synthetic rubber are, for examples, natural rubber or synthetic, rubber-like polymers which are obtained, for example, from conjugated diolefines such as butadiene, dimethylbutadiene, isoprene and its homologues, or coplymers of such conjugated diolefines with polymerisable vinyl compounds such a styrene, α-methylstyrene, acrylonitrile, methacrylonitrile, acrylates and methacrylates.

The retarders to be used according to the invention may be mixed with the rubber in the conventional manner, for example on mixing rollers or in an internal mixer. They are preferably added before or together with the other constituents although they may be added last. The quantity of the retarders according to the invention should preferably be 0.05 to 5.0% by weight and in particular 0.1 to 1.5% by weight of the rubber.

The rubber mixtures which are to be treated contain of course, the usual additives required for vulcanization, such as vulcanizing agents and accelerators. The vulcanizing agent, e.g. rubber, may be used in the usual quantity for vulcanization, which is generally from 0.2 to 5.0% by weight of the rubber. The following are mentioned as examples of accelerators:

Thiazoles such as 2-mercaptobenzothiazole or dibenzothiazyl disulphide, sulphenamides such as benzothiazyl-2-cyclohexyl sulphenamide, benzothiazyl-2-tertiary-butyl sulphenamide or benzothiazysulphenomorpholine, guanidines such as diphenylguanidine or di-o-tolyguanidine, dithiocarbamates such as diethyldithiocarbamic acid zinc, and thiurams such as tetramethylthiuramic disulphide or tetramethylthiuramic monosulphide. Mixtures of accelerators may also be used. The accelerators are generally used in quantities of from 0.05 to 5% by weight of the rubber.

The rubber mixture may also contain other conventional auxiliary agents, e.g. active or inactive fillers such as chalk or carbon black, antioxidants, antiozonants, waxes, pigments, zinc oxide, fatty acids such as stearic acid, or oils which assist in the application of the products.

Vulcanization of the rubber may be carried out by heating to the usual temperatures, preferably to a temperature of from 120° C. to 170° C., but higher or lower temperatures may be employed.

The compounds claimed according to the invention may be prepared by reacting perchloromethylmercaptan or fluorodichloromethanesulphenylchloride with N-arylsulphonamides or with N-aryl-N',N'-dialkylsulphamides.

The examples given below serve to illustrate the invention. The figures given in the tables are parts by weight based on 100.0 parts by weights of the rubber.

The test methods are defined as follows (see also Kautschuk und Gummi; Kunststoffe 20, No. 3/1967, pages 126–134, especially pages 127 and 133).

Scorch time: In analogy to the Mooney Scorch time (see DIN 52524), time determined from the modulus aire time curve until the modulus at 300% elongation increases by 20 points above the minimum (stepwise vulcanization at 110° C.)

M 300: Modulus (kg. wt./cm.$^2$) at 300% elongation according to DIN 53,504, sheet 2.

F: Tensile strength (kg. wt./cm.$^2$) according to DIN 53,504, sheet 1, standard ring R I D: Elongation at beark (percent) according to DIN 53,504, sheet 1, standard ring R I H: Hardness (Shore A), DIN 53,505, range A, 4 mm. flaps:

Complete vulcanization time: Time taken to reach 90% of the maximum modulus value (at 300% elongation) at 140° C.

EXAMPLE 1

49 g. (0.2 mol) of p-toluenesulphonic acid anilide are dissolved in 500 ml. of toluene. 25 g. of triethylamine are added, and a solution of 37 g. (0.2 mol) of trichloromethylsulphenylchloride in 50 ml. of toluene is added dropwise with stirring and cooling to a temperature of 10° C. to 15° C. Stirring is then continued for one hour at 15° C., the precipitated triethylamine hydrochloride is removed by suction filtration, and the solvent is distilled off under vacuum. The crystal-line residue is suspended in light fraction petroleum hydrocarbons and filtered with suction. To purify the product, it is suspended in methanol, suction filtered and washed with methanol. 59 g. of colourless crystals of M.P. 121° C. to 122° C. are obtained.

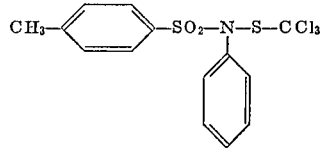

*Analysis.*—Calcd. for $C_{14}H_{12}Cl_3NO_2S_2$ (396.5) (percent): C, 42.4; H, 3.0; N, 3.5. Found (percent): C, 43.1; H, 3.3; N, 3.9.

If the amides mentioned under A in the following Table I are used instead of p-toluenesulphonic acid anilide and the sulphene chlorides mentioned under B are used instead of trichloromethylsulphenyl chloride, the reaction products C are obtained.

TABLE I

| A | B | C | M.P., degrees |
|---|---|---|---|
| CH₃—SO₂—NH—⟨phenyl⟩ | Cl—S—CCl₃ | CH₃—SO₂—N(—phenyl)—S—CCl₃ | 110–112 |
| Cl—CH₂—SO₂—NH—⟨phenyl⟩ | Cl—S—CCl₃ | Cl—CH₂—SO₂—N(—phenyl)—S—CCl₃ | 130–131 |
| C₆H₅—SO₂—NH—⟨phenyl⟩ | Cl—S—CCl₃ | ⟨phenyl⟩—SO₂—N(—phenyl)—S—CCl₃ | 111–112 |
| C₆H₅—SO₂—NH—⟨phenyl-CH₃⟩ | Cl—S—CCl₃ | ⟨phenyl⟩—SO₂—N(—phenyl-CH₃)—S—CCl₃ | 108–110 |
| (CH₃)₂—N—SO₂—NH—⟨phenyl⟩ | Cl—S—CCl₃ | (CH₃)₂N—SO₂—N(—phenyl)—S—CCl₃ | 104–105 |
| (CH₃)₂—N—SO₂—NH—⟨phenyl⟩ | Cl—S—CFCl₂ | (CH₃)₂N—SO₂—N(—phenyl)—S—CFCl₂ | 105 |
| C₆H₅—SO₂—NH—⟨phenyl⟩ | Cl—S—CFCl₂ | ⟨phenyl⟩—SO₂—N(—phenyl)—S—CFCl₂ | 128–130 |

EXAMPLE 2

The following mixtures were prepared on mixing rolls:

| | Mixture Number | | | | | | | | |
|---|---|---|---|---|---|---|---|---|---|
| | 1 | 2 | 3 | 4 | 5 | 6 | 7 | 8 | 9 |
| Natural rubber, smoked sheets | 100.0 | 100.0 | 100.0 | 100.0 | 100.0 | 100.0 | 100.0 | 100.0 | 100.0 |
| Zinc oxide | 5.0 | 5.0 | 5.0 | 5.0 | 5.0 | 5.0 | 5.0 | 5.0 | 5.0 |
| Stearic acid | 3.0 | 3.0 | 3.0 | 3.0 | 3.0 | 3.0 | 3.0 | 3.0 | 3.0 |
| Aromatic mineral oil plasticizer | 2.5 | 2.5 | 2.5 | 2.5 | 2.5 | 2.5 | 2.5 | 2.5 | 2.5 |
| High abrasion resistant furnace black | 45.0 | 45.0 | 45.0 | 45.0 | 45.0 | 45.0 | 45.0 | 45.0 | 45.0 |
| Naphthenic mineral oil plasticiser | 2.5 | 2.5 | 2.5 | 2.5 | 2.5 | 2.5 | 2.5 | 2.5 | 2.5 |
| Sulphur | 2.3 | 2.3 | 2.3 | 2.3 | 2.3 | 2.3 | 2.3 | 2.3 | 2.3 |
| N-cyclohexyl-2-benzothiazylsulphenamide | 0.5 | 0.5 | 0.5 | 0.5 | 0.5 | 0.5 | 0.5 | 0.5 | 0.5 |
| N-nitroso-diphenylamine (for comparison) | | 0.6 | | | | | | | |
| N-phenyl-N-(trichloromethylsulphenyl)-methylsulphonamide | | | 0.2 | | | | | | |
| N-phenyl-N-(trichloromethylsulphenyl)-chloromethylsulphonamide | | | | 0.2 | | | | | |
| N-phenyl-N-(trichloromethylsulphenyl)-benzenesulphonamide | | | | | 0.2 | | | | |
| N-o-tolyl-N-(trichloromethylsulphenyl)-benzenesulphonamide | | | | | | 0.2 | | | |
| N-phenyl-N-(trichloromethylsulphenyl)-p-toluenesulphonamide | | | | | | | 0.2 | | |
| N-phenyl-N-(trichloromethylsulphenyl)-N',N'-dimethylsulphamide | | | | | | | | 0.2 | |
| Z-phenyl-N-(fluorodichloromethylsulphenyl)-N,N'-dimethylsulphamide | | | | | | | | | 0.2 |

The mixtures obtained were press vulcanized to produce test samples 4 mm. in thickness, heating being carried out stepwise at 110° C. and 140° C. The results shown in Table II were obtained.

TABLE II

| Mixture No. | Scorch retarders | Scorch time at 110° C., min. | Complete vulcanization time at 140° C., min. | Mechanical properties corresponding to the complete vulcanization time | | | |
|---|---|---|---|---|---|---|---|
| | | | | F, kg. wt./cm.² | D, percent | M 300, kg. wt./cm.² | H, shore A |
| 1 | None | 62 | 22.0 | 244 | 540 | 114 | 62 |
| 2 | N-nitrosodiphenylamine (for comparison) | 85 | 28.0 | 228 | 550 | 105 | 60 |
| 3 | N-phenyl-N-(trichloromethylsulphenyl)-methyl sulphonamide | 88 | 26.3 | 237 | 544 | 110 | 61 |
| 4 | N-phenyl-N-(trichloromethylsulphenyl)-chloromethylsulphonamide | 93 | 26.5 | 201 | 470 | 111 | 62 |
| 5 | N-phenyl-N-(trichloromethylsulphenyl)-benzenesulphonamide | 83 | 26.0 | 240 | 542 | 112 | 62 |
| 6 | N-o-tolyl-N-(trichloromethylsulphenyl)-benzene sulphonamide | 79 | 25.3 | 240 | 550 | 112 | 61 |
| 7 | N-phenyl-N-(trichloromethylsulphenyl)-p-toluenesulphonamide | 82 | 25.3 | 239 | 552 | 108 | 61 |
| 8 | N-phenyl-N-(trichloromethylsulphenyl)-N',N'-dimethylsulphamide | 79 | 25.2 | 235 | 545 | 110 | 61 |
| 9 | N-phenyl-N-(fluorodichloromethylsulphenyl)-N',N'-dimethylsulphamide | 84.5 | 25.5 | 242 | 540 | 113 | 62 |

It will be seen from these figures that the new retarders incorporated in an amount of 0.2% by weight based on 100.0 parts by weight of rubber have the same retarding effect as N - nitroso - diphenylamine incorporated in an amount of 0.6% by weight. It follows, therefore, that the new retarders have three times the activity of N-nitroso-diphenylamine, and in some cases even higher activities are found (see Table II).

The complete vulcanization time of every one of the mixtures prepared according to the invention is less than that of the mixture prepared with N-nitroso-diphenylamine. The very advantageous influence of the compounds used according to the invention on the vulcanization characteristics is therefore clear.

What we claim is:

1. In the process of vulcanizing natural rubber or a synthetic rubber-like polymer of a conjugated diolefin in the presence of a vulcanization retarder, the improvement comprising employing, as the vulcanizing retarder, a compound of the formula

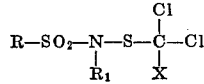

wherein R is alkyl, chloro, cycloalkyl, aryl, alkaryl, chloroaryl, aralkyl or dialkylamino; $R_1$ is aryl, alkaryl, chloroaryl and X is chlorine or fluorine.

2. The process as claimed in claim 1 wherein a vulcanization retarder is incorporated into the mixture in an amount of from 0.05 to 5.0% by weight based on said natural rubber or synthetic rubber-like polymer of a conjugated diolefin.

3. The process as claimed in claim 1 wherein the vulcanization retarder is incorporated into the mixture in an amount of 0.1 to 1.5% by weight based on said natural rubber or synthetic rubber-like polymer of a conjugated diolefin.

4. A process as claimed in claim 1 wherein the vulcanization retarder is N-phenyl-N-(trichloromethylsulphenyl)-methylsulphonamide.

5. A process as claimed in claim 1, wherein the vulcanization retarder is N-phenyl-N-(trichloromethylsulphenyl)-chloromethylsulphonamide.

6. A process as claimed in claim 1, wherein the vulcanization retarder is N-phenyl-N-(trichloromethylsulphenyl)-benzene sulphonamide.

7. A process as claimed in claim 1, wherein vulcanization is carried out at a temperature of from 120° C. to 170° C.

8. A mixture containing natural rubber or a synthetic rubber-like polymer of a conjugated diolefin together with a compound of the formula of claim 1.

9. A mixture containing natural rubber or a synthetic rubber-like polymer of a conjugated diolefin together with N-phenyl-N-(trichloromethylsulphenyl) - methylsulphonamide.

10. A mixture containing natural rubber or a synthetic rubber-like polymer of a conjugated diolefin together with N-phenyl - N - (trichloromethylsulphenyl)-chloromethylsulphonamide.

11. A mixture containing natural rubber or a synthetic rubber-like polymer of a conjugated diolefin together with N-phenyl-N-(trichloromethylsulphenyl)-benzene sulphonamide.

No references cited.

JAMES A. SEIDLECK, Primary Examiner

C. A. HENDERSON, JR., Assistant Examiner

U.S. Cl. X.R.

260—453 R, 556 AR, 556 A, 780

UNITED STATES PATENT OFFICE
CERTIFICATE OF CORRECTION

Patent No. 3,703,500                          Dated November 21, 1972

Inventor(s) Roland Nast, Engelbert Kühle and Manfred Abele

It is certified that error appears in the above-identified patent and that said Letters Patent are hereby corrected as shown below:

Col. 1, line 6, change "Farbenfabriken Bayer Aktiengesellschaft" to -- Bayer Aktiengesellschaft --.

Col. 9, line 63, change "chloro" to -- chloroalkyl --.

Signed and sealed this 13th day of November 1973.

(SEAL)
Attest:

EDWARD M. FLETCHER, JR.
Attesting Officer

RENE D. TEGTMEYER
Acting Commissioner of Patents